United States Patent [19]

Sutherland et al.

[11] Patent Number: 5,344,887
[45] Date of Patent: Sep. 6, 1994

[54] STAR POLYMERS OF DIENES, VINYLARENES AND ALKYL METHACRYLATES AS MODIIED VISCOSITY INDEX IMPROVERS

[75] Inventors: Robert J. Sutherland; Dean A. DuBois, both of Houston, Tex.

[73] Assignee: Shell Oil Company, Houston, Tex.

[21] Appl. No.: 993,740

[22] Filed: Dec. 21, 1992

[51] Int. Cl.$^5$ .................. C08F 297/02; C08F 8/32; C08F 220/10

[52] U.S. Cl. .................. 525/299; 525/192; 525/250; 525/271; 525/302; 525/308; 525/309; 525/310; 525/330.3; 525/330.5; 525/331.9; 525/333.1; 525/333.6.379

[58] Field of Search .......... 525/299, 271, 250, 298, 525/302, 307, 308, 309, 379, 330.3, 330.5

[56] References Cited

U.S. PATENT DOCUMENTS

| | | | |
|---|---|---|---|
| 3,359,345 | 12/1957 | Doak et al. | 525/301 |
| 3,639,521 | 2/1972 | Hsieh | 525/98 |
| 3,890,408 | 6/1975 | Schepers et al. | 525/310 |
| 4,029,720 | 6/1977 | Seiler et al. | 525/89 |
| 4,077,893 | 3/1978 | Kiovsky | 525/301 |
| 4,080,406 | 3/1978 | Kelsey | 525/310 |
| 4,246,374 | 1/1981 | Kopchik | 525/242 |
| 4,461,874 | 7/1984 | Teyssie et al. | 525/299 |
| 4,530,973 | 7/1985 | Koster et al. | 525/310 |
| 4,695,607 | 9/1987 | Spinelli | 525/272 |
| 4,786,689 | 11/1988 | Lund et al. | 525/250 |
| 4,788,361 | 11/1988 | Olson et al. | 585/10 |
| 4,794,144 | 12/1988 | Spinelli | 525/302 |
| 4,794,145 | 12/1988 | Lund et al. | 525/250 |
| 4,975,491 | 12/1990 | Quirk | 525/299 |
| 5,002,676 | 3/1991 | Willis et al. | 525/330.3 |
| 5,194,510 | 3/1993 | DuBois | 525/299 |
| 5,218,053 | 6/1993 | DuBois | 525/299 |
| 5,272,211 | 12/1993 | Sutherland et al. | 525/299 |
| 5,278,245 | 1/1994 | DuBois et al. | 525/299 |

FOREIGN PATENT DOCUMENTS

| | | |
|---|---|---|
| 0298667 | 1/1989 | European Pat. Off. ....... 525/299 |
| 298667 | 1/1989 | European Pat. Off. . |
| 307818 | 3/1989 | European Pat. Off. . |
| 356249 | 2/1990 | European Pat. Off. . |
| 1212987 | 11/1970 | United Kingdom . |

*Primary Examiner*—James J. Seidleck
*Assistant Examiner*—M. L. Warzel
*Attorney, Agent, or Firm*—Keith M. Tackett

[57] ABSTRACT

Star polymers having first polymeric arms comprising a hydrogenated conjugated diene and smaller second polymeric arms of a methacrylate resist coupling of methacrylate blocks attached to different cores and have improved performance as viscosity index improvers. The polymerized methacrylate units are converted to amide or imide groups by reaction with a primary or secondary amine to give the viscosity index improver dispersant properties.

7 Claims, No Drawings

5,344,887

STAR POLYMERS OF DIENES, VINYLARENES AND ALKYL METHACRYLATES AS MODIFIED VISCOSITY INDEX IMPROVERS

FIELD OF THE INVENTION

This invention relates to star polymers having ester groups. More particularly, the invention relates to modified star polymers of hydrogenated isoprene useful as viscosity index improvers for oil compositions.

BACKGROUND OF THE INVENTION

Star polymers useful as viscosity index improvers for oils and lubricants are described in U.S. patent application Ser. No. 942,019 filed Sep. 8, 1992 (T4773N). The star polymers have blocks of a methacrylate at the end of polymeric arms that are grown from a coupled core of a smaller star polymer. The smaller star polymers are prepared by crosslinking small blocks of styrene, isoprene, or butadiene with divinyl benzene. The larger polymeric arms are grown at active lithium sites on the central core of the small star polymers. The methacrylate blocks at the end of the polymeric arms have a strong tendency to couple two or more of the star polymer cores. Coupling of the star polymer cores effectively broadens the molecular weight distribution of the star polymers and reduces performance as viscosity index improvers for lubricating oils. Elimination of the coupling would improve performance in lubricating oils.

Addition of amide groups to polymeric viscosity index improvers increases the dispersency of sludges in lubricating oils. Conversion of acrylic groups in acrylic polymers to amide groups is described in U.S. Pat. No. 4,246,374 which teaches reaction of the acrylic group with an anhydrous primary amine. The conversion reaction occurs between outer limits of about 200° C. and 450° C.

Conversion of the acrylic groups to amide groups will occur in the presence of other monomer units such as styrene, butadiene, or isoprene. However, butadiene and isoprene units in the polymers thermally degrade at temperatures between about 200° C. and 450° C. Conversion of acrylic groups to amide or imide groups at lower temperatures would reduce degradation of polymers containing butadiene or isoprene.

SUMMARY OF THE INVENTION

Star polymers having polymeric arms of a hydrogenated conjugated diene and substantially smaller polymeric arms of a methacrylate resist coupling of methacrylate blocks attached to different cores resulting in improved performance as viscosity index improvers. The methacrylate blocks are easily converted to amide or imide groups by reaction with a primary or secondary amine to give the viscosity index improver dispersant properties. Conversion of polymerized t-butyl methacrylate to amide or imide groups occurs between about 180° C.–400° C.

DESCRIPTION OF THE INVENTION

The present invention includes a polymer molecule comprising at least 3 first arms comprising a preponderance of a hydrogenated, polymerized conjugated alkadiene, each arm having a molecular weight from 10,000 to 200,000, at least 3 arms comprising a preponderance of a polymerized methacrylate, each arm having a molecular weight from 1,000 to 50,000, and a central core comprising a polymerized bisunsaturated monomer, wherein the central core connects the arms in a star configuration and the first arms are longer than the second arms. Preferably, at least 80% of the polymerized methacrylate units have been converted to amide groups.

The star block polymers of the invention are produced by preparing first arms comprising a preponderance of the conjugated diene, coupling the first arms by polymerizing the bisunsaturated monomer, growing second arms comprising the alkyl methacrylate from the polymerized biunsaturated monomer, and hydrogenating the polymerized conjugated diene. The conjugated diene, preferably isoprene or butadiene, is anionically polymerized with an initiator, preferably an alkyl lithium. Alkyl lithium initiators having a secondary alkyl group are preferred. Most preferred is sec-butyllithium.

The bisunsaturated monomer couples the conjugated diene arms into a "star" molecule having a plurality of the first polymeric arms radiating from a central core which comprises the polymerized bisunsaturated compound. After coupling, the core of the molecules contain residual lithium sites which initiate the growth of the second polymeric arms.

One or more of the first polymeric arms may comprise a polymerized vinylarene in a random, tapered, or block configuration with the polymerized conjugated diene. The preferred vinylarene is styrene and the preferred styrene content for the star polymers is less than 10%.

The polymerization to produce the first polymeric arms is conducted by the conventional method of contacting the monomer and polymerization initiator in a suitable reaction solvent under moderate reaction conditions. Hydrocarbon reaction solvents, particularly cycloaliphatic hydrocarbon solvents such as cyclohexane are suitable as reaction solvents. It is useful on some occasions to employ a reaction solvent of greater polarity and in such instances a mixed solvent, often a mixture of cyclohexane and a polar co-solvent, e.g., an ether co-solvent such as diethyl ether or tetrahydrofuran, is used. The use of cyclohexane or cyclohexane-diethyl ether as reaction solvent is preferred. The polymerization temperature is moderate, for example from about 10° C. to about 80° C. and it is often useful to conduct this polymerization at ambient temperature. The reaction pressure is a pressure sufficient to maintain the reaction mixture in a liquid phase. Typical reaction pressures are from about 0.8 atmospheres to about 5 atmospheres.

Control of the molecular weight of the first polymeric arms is achieved by conventional methods such as controlling the ratio of initiator to monomer. The polymeric arms are conventionally termed a living polymer because of the presence therein of an organometallic site. The first polymeric arms preferably have a peak molecular between 10,000 and 200,000, most preferably between 20,000 and 100,000.

The first polymeric arms serve as the polymerization initiator for the bisunsaturated monomer which crosslinks to form the central core of the star polymer molecules. A variety of bisunsaturated monomers are useful in the production of the core of the star block polymers of the invention. Preferred bisunsaturated monomers are di(alkenyl) aromatic compounds having up to 20 carbon atoms and up to 2 aromatic rings, including divinylbenzene, divinyltoluene, divinylbiphenyl, divinylnaphthalene, diisopropenylbenzene, diisopropenylbiphenyl and diisobutenylbenzene. Most preferred is divinylbenzene.

The crosslinking of the bisunsaturated monomer with the first polymeric arms is preferably conducted by adding the bisunsaturated monomer to the reaction mixture containing the first polymeric arms. The use of the same or similar reaction conditions and reaction solvent are suitable for the crosslinking reaction to form the core of the star block polymer.

The core of crosslinked bisunsaturated monomer has a plurality of organometallic sites which serve as the polymerization initiator for the methacrylate which forms the relatively smaller second polymeric arms. Alkyl methacrylates are preferred. The alkyl group on the alkyl methacrylate monomer has up to 30 carbon atoms, preferably up to 20 carbons. The alkyl methacrylate is polymerized through the ethylenic unsaturation of the methacrylate group. The alkyl methacrylate monomers which are polymerized according to this invention include methyl methacrylate, ethyl methacrylate, sec-butyl methacrylate, t-butyl methacrylate, sec-amyl methacrylate, octyl methacrylate, decyl methacrylate, dodecyl methacrylate and octadecyl methacrylate. Polymerization is preferably conducted in the reaction mixture containing the star molecules having organometallic sites on the central core.

The choice of alkyl methacrylate will in part depend upon the particular nature of the star block polymer desired. However, the production of polymerized alkyl methacrylate branches wherein the alkyl is primary and of few carbon atoms is relatively difficult because of the rather low reaction temperatures that are required to produce the polymerized alkyl methacrylate branches. Alternatively, the production of polymerized alkyl methacrylate branches wherein the alkyl moiety is a higher alkyl moiety is also difficult because of the relatively inactive character of such alkyl methacrylates and the difficulty of readily obtaining the desired alkyl methacrylate monomer. The preferred alkyl methacrylates for forming the star block polymer of methacrylate-containing branches is a branched-butyl methacrylate, i.e., sec-butyl methacrylate or t-butyl methacrylate. The star block polymers resulting from use of these methacrylates are preferred products because of the desirable properties thereof and because of the relative ease of production. Star block polymers incorporating other alkyl methacrylate moieties are produced directly from the corresponding alkyl methacrylate but it is often desirable to produce such polymers by initially employing a branched-butyl methacrylate to produce a star block polymer having branched-butyl methacrylate branches and subsequently trans-esterifying the initial star block polymer product to incorporate the desired alkyl moieties.

In the production of a branched-butyl methacrylate-containing polymer suitable reaction conditions typically include a reaction temperature from about $-80°$ C. to about 80° C. with the lower portion of that range being preferred for polymerization of sec-butyl methacrylate and the higher portion of the range being preferred for t-butyl methacrylate. The polymerization pressure is suitably sufficient to maintain the reaction mixture in a liquid phase, typically up to about 5 atmospheres.

The star polymers are hydrogenated to reduce the extent of unsaturation in the aliphatic portion of the polymer. A number of catalysts, particularly transition metal catalysts, are capable of hydrogenating the aliphatic unsaturation of the star polymers. It is preferred to employ a "homogeneous" catalyst formed from a soluble nickel compound and a trialkylaluminum. Nickel naphthenate or nickel octoate is a preferred nickel salt. Although this catalyst system is one of the catalysts conventionally employed for selective hydrogenation in the presence of aromatic groups, other "conventional" catalysts are not suitable for hydrogenation of the conjugated alkadienes in the ester containing polymers.

In the hydrogenation process, the base polymer is reacted in situ, or if isolated is dissolved in a suitable solvent such as cyclohexane or a cyclohexane-ether mixture and the resulting solution is contacted with hydrogen gas in the presence of the homogeneous nickel catalyst. Hydrogenation takes place at temperatures from about 25° C. to about 150° C. and hydrogen pressures from about 15 psig to about 1000 psig. Hydrogenation is considered to be complete when at least about 90%, preferably at least 98%, of the carbon-carbon unsaturation of the aliphatic portion of the base polymer has been saturated, as can be determined by nuclear magnetic resonance spectroscopy.

The hydrogenated star polymer is then recovered by conventional procedures such as washing with aqueous acid to remove catalyst residues, solvent removal, or addition of a non-solvent to coagulate the polymer. A typical non-solvent for this purpose is aqueous methanol.

DESCRIPTION OF PREFERRED EMBODIMENT

The preferred polymers of the invention comprise an average per molecule of 10–50 first arms consisting of hydrogenated, polymerized isoprene or blocks of styrene and hydrogenated, polymerized isoprene, the first arms having a peak molecular weight from 10,000 to 100,000, at least 10–50 second arms consisting of polymerized t-butylmethacrylate, the second arms having a peak molecular weight from 1,000 to 10,000, wherein at least 80% of the polymerized t-butylmethacrylate units have been converted to amide or imide groups, and one central core per molecule, the core comprising polymerized divinylbenzene, wherein the central cores connect the first and second polymeric arms in a star configuration.

The molecular weight of the star polymers of the invention will vary with the choice of reaction conditions, reaction solvent and the relative proportions of monomeric reactants as well as determined in part by whether the functionalized branches are homopolymeric or contain an internal portion of polymerized anionically polymerizable monomer. The star polymers of particular interest have a peak molecular weight from about 33,000 to about $5.5 \times 10^6$ and most preferably from about 100,000 to about $3 \times 10^6$. The precise peak molecular weight will vary from molecule to molecule and the above values are average values. It is, however, characteristic of the star polymers of the invention that the polymer has a rather narrow molecular weight distribution.

The star polymers are represented by the formula $$(A-)_t-C-[-M]_s \qquad (I)$$

wherein C comprises the crosslinked bisunsaturated monomer, A comprises the hydrogenated, polymerized conjugated diene, M comprises the polymerized alkyl methacrylate, wherein each alkyl independently has up to 30 carbon atoms polymerized through the ethylenic unsaturation of the methacrylate moiety, s is the number of polymeric arms grown from the block of crosslinked unsaturated monomer, and t is the number of conjugated alkadiene arms up to 50 which is equal to or greater than s.

While the proportions of the moieties represented by the terms C, A, and M will vary somewhat from molecule to molecule, the percentage of the molecular weight of the molecule attributable to the central core, C, is no more than about 10% and preferably no more than about 2%.

Each A block or segment in the preferred star polymer preferably comprises at least 90% by weight of the hydrogenated, polymerized conjugated diene. The conjugated alkadienes preferably have up to 8 carbon atoms. Illustrative of such conjugated alkadienes are 1,3-butadiene (butadiene), 2-methyl-1,3-butadiene (isoprene), 1,3-pentadiene (piperylene), 1,3-octadiene, and 2-methyl-1,3-pentadiene. Preferred conjugated alkadienes are butadiene and isoprene, particularly isoprene. Within the preferred polyalkadiene blocks or segments, the percentage of units produced by 1,4 polymerization is at least about 5% and preferably at least about 20%.

Each M is preferably a methacrylate block or segment comprising at least 90% by weight of a polymerized alkyl methacrylate. Homopolymeric M segments or blocks of alkyl methacrylates are most preferred. The alkyl methacrylates have the structure:

$$CH_2=C-C-O-R \quad (II)$$

(with $CH_3$ substituent and $=O$)

wherein R is an alkyl group comprising from 1 to 30 carbon atoms, preferably 1 to 10 carbon atoms. The most preferred alkyl methacrylates are s-butyl methacrylate and t-butyl methacrylate. The t-butylmethacrylate monomer is commercially available in high purity from Mitsubishi-Rayon, Japan.

Less pure t-butylmethacrylate is available from Monomer, Polymer and Dajac and can be used if passed through a column of alumina and 13X zeolite to remove methacrylic acid and t-butylalcohol. The preferred zeolites have a cavity size no less than 10 angstroms such as Zeolite 13X which has the formula $Na_{86}(AlO_2)_{86}(SiO_2)_{106}.267H_2O$.

The star polymers of this invention have the advantage of little or no coupling of two or more molecules during polymerization of the alkyl methacrylate.

The amide or imide groups in the preferred polymers of the invention are produced by heating the base polymers to a temperature from about 180° C.–400° C. in the presence of a primary or secondary amine. Heating is preferably conducted in an extruder having a devolatization section to remove volatile by-products.

Primary amines useful for the invention include compounds having the structure $R-NH_2$ as described in column 3, lines 32–62, of U.S. Pat. No. 4,246,374 which disclosure is incorporated by reference herein. The most preferred primary amine is N,N-diethylaminopropylamine. Secondary amines of the type $R_1R_2NH$ will result in useful amide groups, but are less preferred.

The polymers of the invention, like the base copolymers, contain polar groups and have utilities conventional for such polymers. The polar polymers are particularly useful as both the dispersant and viscosity index improver in motor oils.

The invention is further illustrated by the following Illustrative Embodiments which should not be construed as limiting.

EXAMPLE 1

A first reactor was charged with 270 pounds of cyclohexane and 30 pounds of styrene monomer. To the stirred mixture 6.5 pounds of sec-butyllithium was added and the styrene was polymerized for 10 half-lives at 60° C.

In a second reactor 273 pounds of cyclohexane and 50 pounds of isoprene monomer were titrated with sec-butyllithium to remove any impurities. Then 27 pounds of the living homopolystyrene from step 1 was added to the isoprene and the isoprene was polymerized for 12 half-lives at 60° C. Next, 200 ml of divinylbenzene (55% dvb) was added to the living styrene-isoprene polymeric arms and reacted at 80° C. for 30 minutes to form the living star polymer.

The temperature of the star polymer mixture was lowered to 35° C. and 1.20 pounds of tert-butylmethacrylate (tBMA) was added to the reaction. The tBMA was polymerized for 30 minutes at 35° C. to form the second polymeric arms, and the reaction was quenched with 19 ml of methanol.

The star polymer of Example 1 was hydrogenated using a catalyst composed of nickel octoate reduced by triethyl aluminum. The ratio of nickel to aluminum for this particular example was 1:2.3. The total catalyst charge was periodically increased to give a product with low residual unsaturation.

EXAMPLE 2

A reactor was charged with 12,300 grams of dry cyclohexane and 1,360 grams of isoprene monomer. The cyclohexane and isoprene were titrated with sec-butyllithium to remove impurities, then 26.8 ml of 1.45M sec-butyllithium was added to polymerize the isoprene. The isoprene was allowed to react for ten half-lives at about 60° C. Then 32 ml of 55% divinylbenzene was added to couple the star polymer.

A first two liter Büchi reactor was charged with 1110 grams of the living star polymer solution. The stirred solution was reacted with 5.7 g of tBMA monomer, dissolved into 21.5 ml of cyclohexane, for 1 hour. The reaction was then quenched with 0.4 ml of methanol.

A second two liter Büchi reactor was charged with 1035 grams of the living polymer solution. The stirred solution was reacted with 5.3 grams of tBMA monomer, dissolved into 20 ml of cyclohexane, for 1 hour. The reaction was quenched with 0.3 ml of methanol.

The polymer solutions from both Büchi reactors were then combined and hydrogenated with the nickel catalyst from Example 1 to remove the unsaturation in the polyisoprene blocks.

EXAMPLE 3

Conversion of TBMA to Amide

The conversion of the polymerized t-butylmethacrylate in Examples 1 and 2 to amide groups was carried out in an extruder. For this particular example a Brabender melt mixer was used. The Brabender was heated to 250° C. and 60 grams of polymer was added with the mixing blades at 100 rpm. When the melt was uniformly mixed, a mixture of N,N-diethylaminopropylamine (DAP) and Penrico Oil was added over 3 minutes time (the oil serves to prevent the DAP from vaporizing out of the Brabender before it can mix with the polymer melt). The sample was allowed to mix for 3 minutes longer and then was removed from the Brabender. FT-IR analysis shows conversion to the amide, the ester peak at 1726 cm$^{-1}$ is replaced with an amide peak at 1667 cm$^{-1}$. Analysis by FT-IR revealed that the conversion to amide was at least 80% based on the ratio of carbonyl absorbance to amide carbonyl absorbance.

Comparative Example A

A 600 ml beaker, contained inside a glove box with a dry nitrogen atmosphere, was charged with 380 ml of cyclohexane and 20 ml of diethylether. To this was added 3 ml of 1.4M sec-butyllithium followed by 10 ml of styrene monomer. The styrene monomer was polymerized for 20 minutes at ambient temperature. Next, 1 ml of 55% active divinylbenzene was added to the reaction and allowed to couple for 15 minutes. Finally, 50 ml of lauryl methacrylate monomer, treated with 10 microliters of triethyl aluminum, was added to the reaction as a steady stream and allowed to react for 30 minutes. The reaction was quenched with methanol and the polymer was recovered by precipitation in methanol. GPC analysis of the product showed a broadly distributed, polymodal material.

EXAMPLE 4

Dispersant Viscosity Index Improver

The star block copolymer from Example 3 having no styrene was blended with a motor oil to give SAE 5W-30 and 10W-40 formulations. The oils in Table 3 were blended in Exxon 100N LP, the DI package was composed of an experimental Lubrizol additive, Acryloid 155 pour point depressant was added at 0.5 wt % and the polymer concentrate to give about 11 cSt kinematic viscosity at 100° C. The cold cranking simulator (CCS) viscosity was then measured at −25° C. For Comparison B, a star polymer prepared as in Example 2, but having no tBMA was blended with the same oil to give oil formulations having the same kinematic viscosity (and same CCS viscosity for 10W-40 oils).

Each of the polymers was then blended in Exxon 100N LP at 5% concentration for further work. The blending was done at 120° C. to 130° C. using the Silverson mixer until the polymer was completely dissolved. A small amount of antioxidant was used in each case to protect the polymer and the base oil from thermal oxidation.

Tables 1, 2, and 3 show the rheological performance of the inventive dispersant VI improvers of Example 4 and Comparison B. In Tables 1-3, TP1-MRV refers to Temperature Profile 1 in the Mini-Rotary Viscometer which is a measurement required for obtaining an SAE grading of a lubricating oil. The TP1-MRV measurement must be conducted in accordance with ASTM D4684 entitled "Standard Test Method for Determination of Yield Stress and Apparent Viscosity of Engine Oils at Low Temperature". Also in Tables 1-3, DIN, % Vis. Loss refers to standard diesel injection tests which measure a decrease in viscosity due to shearing of lubricating oils in a diesel injection nozzle as determined by ASTM D-3945 or Coordinating European Counsel Test CEC L-14-A-88. The low-temperature properties of the inventive polymers is equal to or better than that of the non-dispersant polymers (see CCS and TP1-MRV data). Table 3 shows that the inventive DVII's are particularly enhanced in CCS performance when compared to known commercial DVII polymers in identical blends.

Fully formulated oils were prepared from the above polymer concentrates, Lubrizol DI packages, Acryloid pour depressants and Exxon base stocks. The oils in Tables 1 were blended with an experimental Lubrizol DI package, and Acryloid 155 was used at 0.5%. Exxon 100N LP was used for the SAE 5W-30 oils. Exxon 100N LP and Exxon 325N were used for the 10W-40 oils. The SAE 10W-40 oils were blended to about 14 cSt viscosity at 100° C. and the CCS viscosity shown in Table 1 at −20° C. The oils in Table 2 were all blended in Exxon 100N LP, an experimental Lubrizol DI package, Acryloid 155 pour point depressant at 0.5%, and the polymer concentrates. The oils are blended to about 11 cSt viscosity at 100° C. and the CCS is measured at −25° C.

TABLE 1

Comparison of SAE 10W-40 Oil Formulations.

| Property | Example 4 | Comparison B |
|---|---|---|
| KV, cSt | 14.0 | 14.2 |
| CCS, cP | 3110 | 3136 |
| TP1-MRV, cP | 15,317 | 16,018 |
| TBS, cP | 3.67 | 3.77 |
| DIN, % Vis. Loss | 2.30 | 2.0 |

TABLE 2

Comparison of SAE 5W-30 Oil Formulations.

| Property | Example 4 | Comparison B |
|---|---|---|
| KV, cSt | 10.8 | 11.02 |
| CCS, cP | 3056 | 2970 |
| TP1-MRV, cP | 15,036 | 15,665 |
| TBS, cP | 3.03 | 3.11 |

TABLE 3

Rheology of SAE 5W-30 oils containing DVII polymer.

| VII | KV, cSt | CCS, cP |
|---|---|---|
| PARATONE ® 855 | 11.0 | 4142 |
| ACRYLOID ® 954 | 10.8 | 3472 |
| AMOCO ® 6565 | 10.7 | 3527 |
| TLA ® 7200 | 10.8 | 3598 |
| Comparison B | 10.7 | 3245 |
| Example 4 | 10.8 | 3056 |

The inventive polymers from Example 4 were tested for dispersancy in a blotterspot dispersancy test. An oil drain form a test car was used as the test oil for the blotter spot test (the oil was used for 7,500 miles of city driving). The test oil was doped with the inventive polymer at 0.5%, 1.0% and 2.0% wt. The well mixed solutions were then spotted on Millipore ® filter discs of 0.45μ pore size. The inventive polymer showed improved dispersancy when compared with the spot test for the undoped oil.

What is claimed is:

1. A polymer comprising:
   an average per molecule of at least 10 first arms consisting of completely hydrogenated isoprene or styrene and completely hydrogenated isoprene, the first arms having a peak molecular weight from 10,000 to 100,000, wherein at least 5% of the polymerized isoprene is produced by 1,4-polymerization;

an average per molecule of at least 10 second arms consisting of polymerized t-butylmethacrylate, the second arms having a peak molecular weight from 1,000 to 10,000, wherein the first arms are longer than the second arms, the number of first arms is greater than or equal to the number of second arms, and at least 80% of the polymerized t-butylmethacrylate units have been converted to amide or imide groups; and one central core per molecule, the core comprising a polymerized divinylbenzene, wherein the central cores connect the first and second arms in a star configuration and the central core is no more than 10% of the polymer molecular weight.

2. The polymer of claim 1, wherein the first arms consist of isoprene and styrene.

3. The polymer of claim 1, wherein the average number of first arms per polymer molecule is from 10 to 50 and the average number of second arms per polymer molecule is from 10 to 50.

4. The polymer of claim 1, wherein the peak molecular weight of the first arms is from 10,000 to 100,000 and the peak molecular weight of the second arms is from 500 to 10,000.

5. A process for making a polymer, comprising the steps of:

anionically polymerizing first arms comprising a conjugated diene, the first arms having a peak molecular weight from 10,000 to 200,000, wherein at least 5% of the polymerized conjugated diene is produced by 1,4-polymerization;

coupling the first arms with a bisunsaturated compound to form central cores, wherein the central cores are no more than 10% of the polymer molecular weight;

anionically polymerizing a methacrylate to grow second polymeric arms from the central cores, the second polymeric arms having a peak molecular weight from 1,000 to 10,000, wherein the first arms are longer than the second arms and the number of first arms is greater than the number of second arms;

converting at least 80% of the polymerized methacrylate units to amide or imide groups; and completely hydrogenating the polymerized conjugate diene.

6. The process of claim 5, wherein the first arms comprise styrene and isoprene and the methacrylate is t-butylmethacrylate.

7. The process of claim 6, wherein the styrene and the isoprene are present in homopolymer blocks.

* * * * *